United States Patent [19]

Ochiai et al.

[11] Patent Number: 4,746,827
[45] Date of Patent: May 24, 1988

[54] ROTOR FOR ELECTRIC MOTOR

[75] Inventors: Izumi Ochiai; Hideo Hashida; Yoshio Asahino; Nobuhiko Yokota, all of Tochigi, Japan

[73] Assignee: Hitachi, Ltd., Tokyo, Japan

[21] Appl. No.: 15,630

[22] Filed: Feb. 17, 1987

[30] Foreign Application Priority Data

Feb. 28, 1986 [JP] Japan .................................. 61-41745

[51] Int. Cl.$^4$ ............................................ H02K 21/14
[52] U.S. Cl. .................................... 310/156; 310/261; 310/271
[58] Field of Search ................ 310/156, 261, 262, 271

[56] References Cited

U.S. PATENT DOCUMENTS

| | | | |
|---|---|---|---|
| 2,060,259 | 11/1936 | Spengler | 310/156 |
| 2,071,536 | 2/1937 | Kalin | 310/156 |
| 2,432,436 | 12/1947 | Morrill | 310/156 |
| 4,633,113 | 12/1986 | Patel | 310/156 |

Primary Examiner—Donovan F. Duggan
Attorney, Agent, or Firm—Antonelli, Terry & Wands

[57] ABSTRACT

A rotor for an electric motor including an iron core having collar portions at both end portions thereof, and a magnet placed on the outer periphery of said iron core. The magnet is held at both end portions thereof between the collar portions.

5 Claims, 2 Drawing Sheets

ROTOR FOR ELECTRIC MOTOR

BACKGROUND OF THE INVENTION

The present invention relates to a rotor for an electric motor, and more particularly to a rotor of this kind which is designed to be suitable for fixing in place a cylindrical permanent magnet.

Japanese Utility Model Laid-Open No. 97588/1984 discloses a conventional rotor for an electric motor. A description of such a conventional rotor for an electric motor will be given with reference to FIG. 4 showing a longitudinal sectional view of an electrically-operated compressor of the sealed-type.

In the drawing, reference number 24 designates a sealed housing within which a compression mechanism 22 and an electric motor 23 are accommodated.

The electric motor 23 will be described in detail. Reference number 25 designates a stator. This stator 25 is secured to the internal wall of the sealed housing 24. Reference number 26 designates a permanent magnet rotor. The permanent magnet rotor 26 comprises an iron core (yoke) 28, a permanent magnet 29, a surface reinforcing member 34, and an aluminum diecast member 31. The permanent magnet 29 is provided on the outer periphery of the iron core 28.

That is, the surface reinforcing member 34 is provided for the purpose of securing the permanent magnet 29 to the outer peripheral surface of the iron core 28. The aluminum diecast member 31 is provided for the purpose of connecting the iron core 28 and the permanent magnet 29.

However, a conventional rotor having such a structure encounters problems with respect to both productivity and performance. These problems include the following:

(i) The yoke and the permanent magnet have to be assembled by use of adhesive before they are placed into a diecast mold;

(ii) Since it is necessary to prevent penetration of diecast material between the surface reinforcing member and the wall of the diecast mold, the surface reinforcing member cannot be made very thin; and (iii) The thermal affect of diecasting makes it impossible to obtain a high degree of precision.

SUMMARY OF THE INVENTION

An object of the present invention is to provide a rotor for an electric motor which is designed to enable a cylindrical magnet to be fixed to the iron core with a high degree of precision and with ease.

In order to accomplish the above object, a rotor for an electric motor in accordance with the present invention is characterized in that a magnet provided on the outer periphery of an iron core for an armature is held between both ends of the iron core.

With a rotor for an electric motor having a structure in accordance with the present invention, manufacturing the rotor does not necessitate any adhering or diecasting process, and the rotor can be processed continuously and automatically. Therefore, the number of processes employed during its manufacture can be greatly reduced.

In addition, it is possible to make the tubular member which serves to reinforce the outer periphery of the magnet thin, thus improving the performance of the electric motor in which the rotor of the invention is used.

DETAILED DESCRIPTION OF THE PREFERRED EMBODIMENTS

Figure 1:
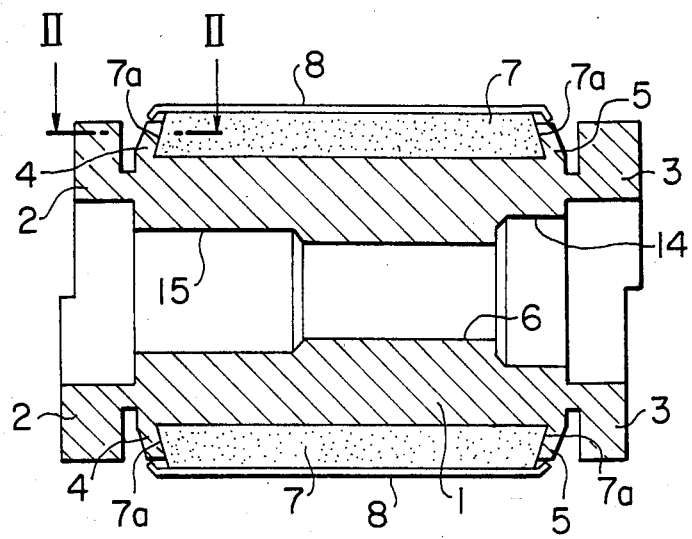
FIG. 1 is a longitudinal sectional view of a rotor for an electric motor in accordance with a first embodiment of the present invention.

In the drawings, reference number 1 designates an iron core formed by cutting a portion of a soft steel material into a shape like a bobbin. The iron core 1 has on the outer periphery of both ends thereof flange portions 2 and 3 which project radially. Collar portions 4 and 5 which also project radially are formed on the inner sides of the flange portions 2 and 3. A rotational shaft connecting portion 6 is provided on the center axis of the iron core. This portion 6 is provided for inserting the rotational shaft (not shown) of an electrically-operated compressor and thus connecting the same. A magnet 7 is made of a ferrite magnet and is formed of a cylindrical magnet divided into a plurality of sections. Reference number 7a designates inclined portions formed on flat faces of the sections of the magnet 7, which are inclined in such a manner that the sections of a respective magnet 7 on their outer diameter have a smaller axial size than those on their inner diameter. The inclination at which these portions 7a are formed corresponds to the draft used during the formation of the magnet 7. Cutouts 7b are formed on corner portions of adjacent sections of the magnet 7. A reinforcing tube 8 which is formed of stainless steel of an austenite series is placed on the outer periphery of the magnet 7.

Reference numbers 14 and 15 designate cavities communicating with the rotational shaft connecting portion 6. Weight-balancing portions are formed in the iron core 1.

Figure 2:
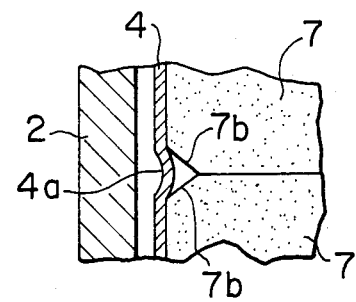
FIG. 2 is a sectional view of a part of the rotor taken along the line II—II shown in FIG. 1 and drawn to an enlarged scale.

With such a structure, the collar portions 4 and 5 are made to hold the magnet 7 therebetween by virtue of the fact that the magnet 7 is mounted between them, and the collar portions 4 and 5 are deformed to deflect toward the magnet 7 by means of a punch or the like. At this time, portions of the collar portions 4 and 5 are pushed into the cutouts 7b of the magnet 7, thus forming indentations 4a, as shown in FIG. 2, in the collar portions 4 and 5. These indentations 4a serve to limit movement of the magnet 7 in the direction of rotation. In addition, since the collar portions 4 and 5 are brought into contact with the inclined portions 7a of the magnet 7, the inclined portions 7a serve to limit the movement of the magnet 7 in the radial direction. This limitation is further strengthened by the provision of the reinforcing tube 8.

The foregoing description concerns a structure in which the magnet is held between both ends of the iron core by the collar portions provided on the iron core, thereby fixing in place the magnet on the outer periphery of the iron core. However, the present invention is not limited to this structure, and may be applied to an alternative structure in which gaps are provided between the flanges of the iron core and the magnet, and in which caulking members are inserted into the gaps.

Figure 3:
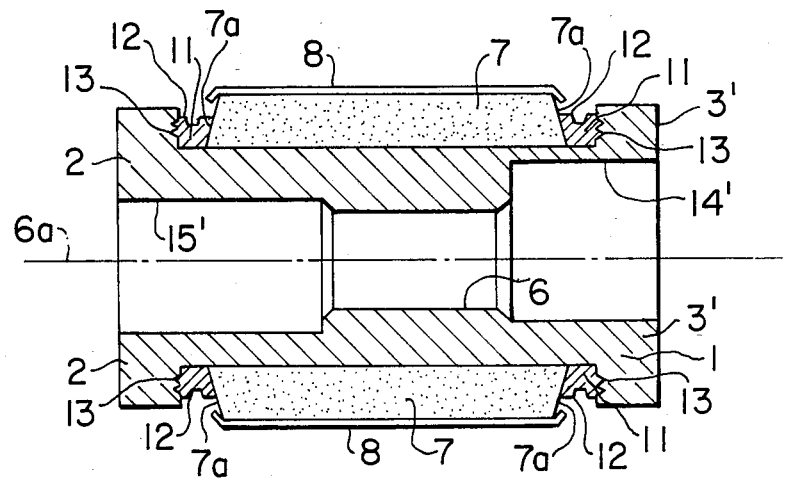
FIG. 3 is a longitudinal sectional view of a rotor for an electric motor in accordance with a second embodiment of the present invention.
Figure 4:
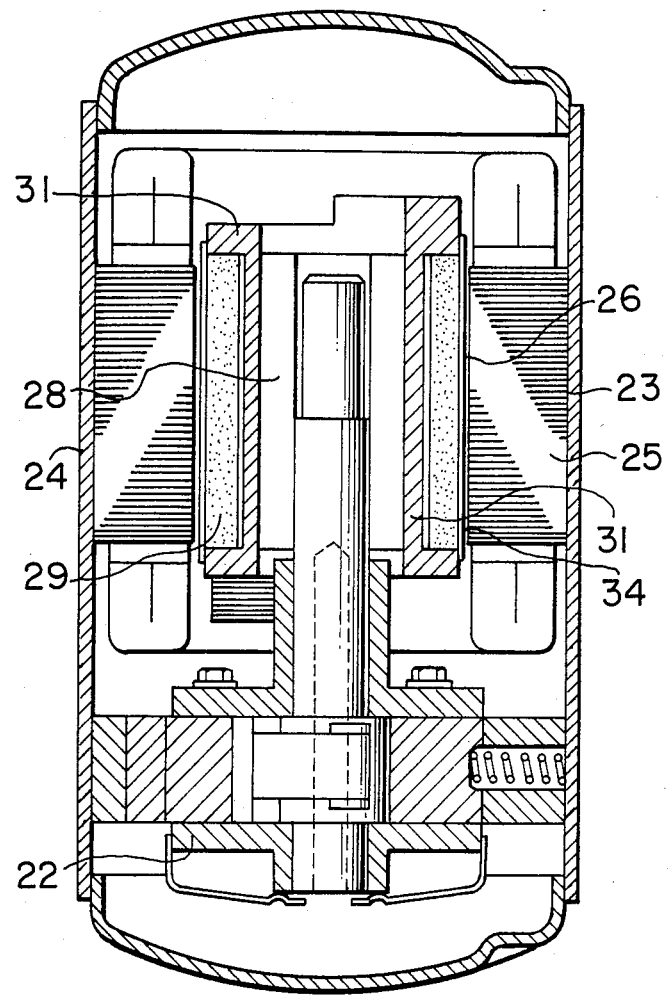
FIG. 4 is a longitudinal sectional view of a compressor showing the structure of a conventional armature.

FIG. 3 is a view showing another embodiment of the invention which may be applied to such an alternative structure. The same reference numbers as those shown in FIG. 1 designate the same or corresponding elements.

In the drawing, the iron core 1 is made of cast iron having a high degree of cutting ability. Reference numbers 14' and 15' designate cavities. These cavities 14' and 15' are formed eccentrically with respect to the central axis 6a of the rotational shaft connecting portion 6. This eccentric arrangement causes variations in the iron core 1, which defines the cavities 14' and 15', with respect to the weight balance. The cavities 14' and 15' are formed to compensate for the variations in the weight balance.

Reference number 3' designates flange portions provided in accordance with this embodiment of the present invention. Grooves 13 are formed in the flange portions 3'. Reference number 12 designates gaps formed between the magnet 7 and the flange portions 3'.

Caulking members, such as aluminum wires 11, are inserted into these gaps 12. A pressure is applied to the aluminum wires 11 by a suitable means such as a punch, and the wires 11 are thus caused to move into the grooves 13 formed in the flange portions 3' as well as to urge the magnet 7 at its inclined portion 7a toward the iron core 1. In this way, the magnet 7 is positively fixed to the iron core 1 by the aluminum wires 11.

In accordance with this embodiment of the present invention, the caulking of the magnet 7 to the iron core 1 is provided by applying pressure to the aluminum wires 11 wound between the flange portions 3' of the iron core 1 and the magnet 7 in the radial direction of the iron core 1, thus causing the aluminum wires 11 to move into the grooves 13 formed in the flange portions 3'; at the same time, the magnet 7 becomes fixed by virtue of the residual compressive stress which remains in the axial direction of the aluminum wires 11 and the magnet 7. By virtue of providing such caulking in accordance with this embodiment of the invention, it is possible to ensure very stable and firm fixing of the magnet 7 as well as to prevent any axial leakage of magnetic flux from the magnet 7 by adoption of aluminum layers.

We claim:

1. A rotor for an electric motor, comprising:
an iron core having flange portions at both ends thereof;
a magnet disposed on the outer periphery of said iron core; and
holding means provided between said flange portions and end portions of said magnet for holding said magnet between said flange portions, said holding means being arranged to hold said end portions of said magnet,
wherein said holding means comprises wire members provided between said collar portions and said end portions of said magnet, said wire members being capable of urging said magnet toward said iron core, thereby fixing said magnet on the outer periphery of said iron core.

2. A rotor for an electric motor according to claim 1, wherein said collar portions have grooves formed therein, said wire members are allowed to move into said grooves when a pressure is applied thereto.

3. A rotor for an electric motor, comprising:
an iron core having flange portions at both ends thereof;
a magnet disposed on the outer periphery of said iron core; and
holding means provided between said flange portions and end portions of said magnet for holding said magnet between said flange portions, said holding means being arranged to hold said end portions of said magent, thereby fixing the magnet on the outer periphery of said iron core,
wherein said end portions of said magnet have inclined portions.

4. A rotor for an electric motor, comprising:
an iron core having flange portions at both ends thereof;
a magnet disposed on the outer periphery of said iron core; and
holding means provided between said flange portions and end portions of said magnet for holding said magnet between said flange portions, said holding means being arranged to hold said end portions of said magnet, said holding means including wire members provided between said collar portions and said end portions of said magnet, said wire members being capable of urging said magnet toward said iron core;
wherein said magnet is divided into sections, cutouts are formed on the corner portions of adjacent sections of said magnet, and said collar portions are capable of being pushed into said cutouts, thereby fixing said magnet on the outer periphery of said iron core.

5. A rotor for electric motor according to claim 1, wherein said magnet is divided into sections.

* * * * *